C. A. HART.
AUTOMOBILE JACK.
APPLICATION FILED OCT. 16, 1911.
1,029,993.
Patented June 18, 1912.
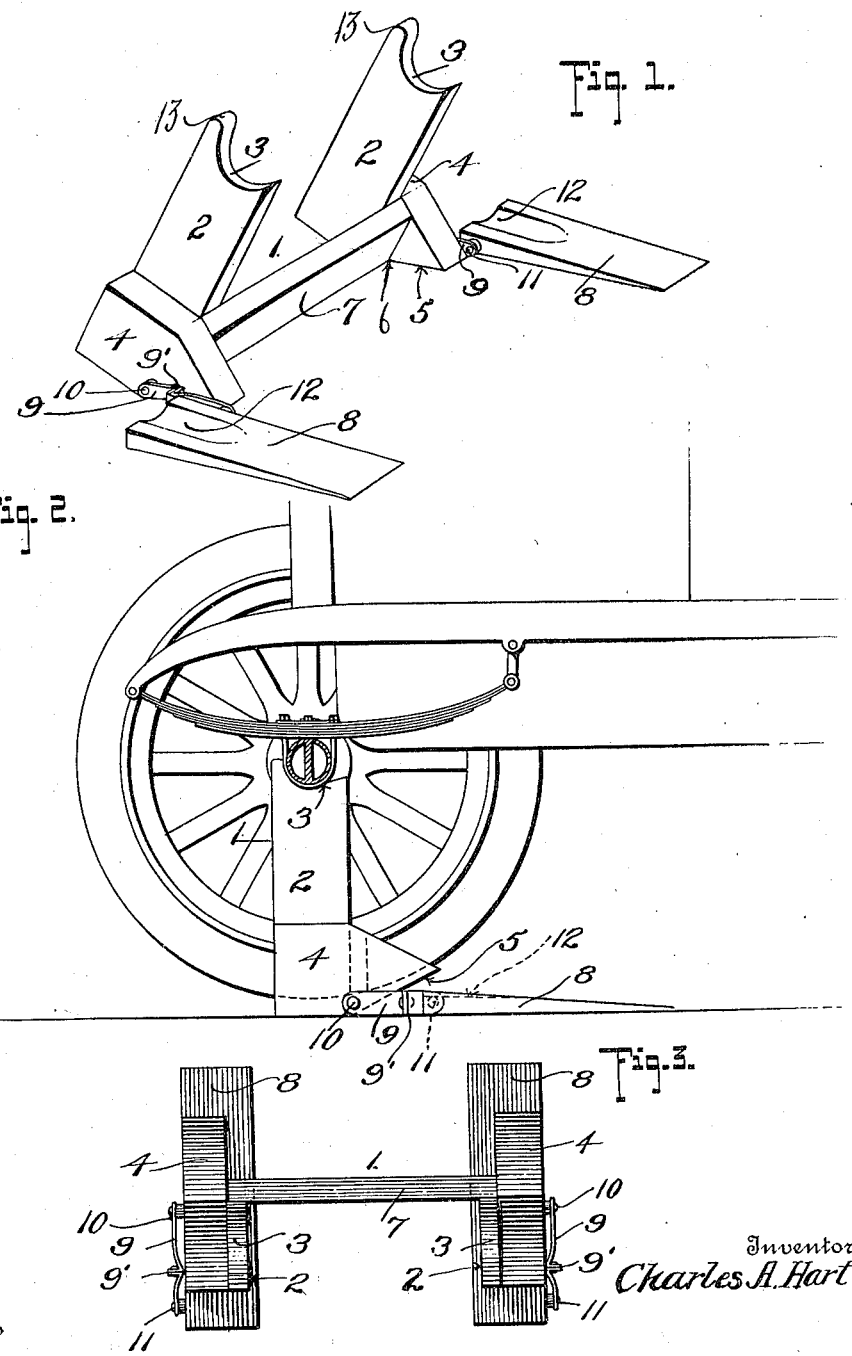

UNITED STATES PATENT OFFICE.

CHARLES A. HART, OF FINDLAY, OHIO.

AUTOMOBILE-JACK.

1,029,993.

Specification of Letters Patent. Patented June 18, 1912.

Application filed October 16, 1911. Serial No. 654,870.

*To all whom it may concern:*

Be it known that I, CHARLES A. HART, a citizen of the United States, residing at Findlay, in the county of Hancock and State of Ohio, have invented certain new and useful Improvements in Automobile-Jacks, of which the following is a specification.

This invention relates to automobile jacks, an object of which is to provide a jack which is suitable particularly for use in automobile garages or similar places.

The jack consists of a tiltable frame which, when tilted, is adapted to grip under the automobile axles and when raised to an upright position to elevate the same.

Another object is to provide a jack which has connected thereto a pair of runners of peculiar construction.
With the above and other objects in view, this invention consists in the construction, combination and arrangement of parts, all as hereinafter more fully described, claimed and illustrated, in the accompanying drawings wherein—

Figure 1 is a perspective view of the device; Fig. 2 is a side elevation; and Fig. 3 is a plan view of the runners inoperatively adjusted.
Throughout the following detail description and on the several figures of the drawings, similar parts are referred to by like reference characters.

Referring to the drawings, the elevating frame is, in general, denoted by 1. Said frame consists of a pair of uprights or standards 2 which have in their upper end a hollow cut 3, said standards being carried by base or fulcrum members 4. The fulcrum members 4 are beveled, as at 5, to form a surface on which the jack will rest when in lowered position. The corner 6 is adapted to serve as a fulcrum for raising the jack to its upright position for the purpose of lifting a pair of automobile wheels. The base members 4 which carry the standard 2 are properly spaced by a connecting member 7. In order that the automobile may be conveniently elevated by the jack, a pair of runners 8 are provided, each of the same being pivotally connected to the adjacent base member 4 by a link 9, said link being secured to the base member by the pivot 10 and to the runner by a pivot
11. The links 9 form floating connections between the parts 4 and 8. The runners 8 are inclined so that the automobile may be readily moved onto the same, and in order that the automobile wheel may be guided, the upper side of the runner adjacent to the thicker end thereof has a hollow guideway, as at 12.

The jack, as illustrated, is adapted for lifting one end of the automobile as is preferable, and which makes a more convenient jack. However, it is to be understood that a pair of jacks of the same construction may be connected by any convenient means for lifting the entire automobile, if so desired.

In operation, the automobile is moved onto the runners 8 and the jack which is then in tilted position resting on the surface 5 will receive the axle in the hollow cuts 3, and the axle will be confined to said cut by the extension or stop 13. Any further movement of the automobile will create a pressure against said extension, thereby raising the jack to an upright position and the corner 6 then serving as a fulcrum. The tapered runners 8 are of peculiar advantage inasmuch as the weight of the automobile will be partly carried by said runners until the jack is almost elevated to its upright position, thereby relieving the automobile axle from considerable strain.

In order that when the device is not in use the space occupied thereby may be economized, the links 9 are provided with several joints 9′, and the runners 8 are adapted to be turned over on their pivots 11 to rest alongside of the bases 4 and then rotated so as to assume a position beneath the latter as shown in Fig. 3. When the device is folded as described the fulcrums rest on the runners.

It will be noted that the runners are connected to the base of the tiltable frame just above the fulcrum point of the latter so that the points of connection 10 will travel in an arcuate path during the tilting of the frame. Since the points of connection 10 move in the above operation it is obvious that the runners also will move during the tilting of the frame. The peripheries of the wheels do not leave the runners on the initial movement of the frame and since the runners are drawn forwardly the pressure of the wheels on the latter will cause the runners to act as a brake and retard the movement of the vehicle, thereby decreasing the tendency of the frame to tilt beyond a vertical operative position.

Having thus fully described my invention, what is claimed as new is:—

1. An automatic jack for automobiles comprising fulcrum members, lifting standards carried by said members and adapted to be engaged by an axle to elevate the latter on tilting of the fulcrum members, runners to receive thereon the wheels of a vehicle, and links each connected at opposite ends with a fulcrum member and its adjacent runner.

2. An automatic jack for automobiles comprising fulcrum members, lifting standards carried by said members and adapted to be engaged by an axle to elevate the latter on tilting of the fulcrum members, runners to receive thereon the wheels of a vehicle, and links each connected at opposite ends with a fulcrum member and its adjacent runner, the connection of each link to its fulcrum member being located at the fulcrum point of the latter.

3. An automatic jack for automobiles comprising fulcrum members, lifting standards carried by said members and adapted to be engaged by an axle to elevate the latter on tilting of the fulcrum members, runners to receive thereon the wheels of a vehicle, and links each connected at opposite ends to the outer side and inner side respectively, of a fulcrum member and its adjacent runner.

4. An automobile jack comprising a tiltable frame, fulcrums therefor, runners, and connecting links between the fulcrums and runners, said links comprising swivel joints to permit the runners to be moved alongside the fulcrum and then rotated to extend beneath the latter.

In testimony whereof I affix my signature in presence of two witnesses.

CHARLES A. HART.

Witnesses:
CHARLES A. STOCKTON,
J. B. WINKLER.

Copies of this patent may be obtained for five cents each, by addressing the "Commissioner of Patents, Washington, D. C."